(12) United States Patent
Suzuki et al.

(10) Patent No.: US 7,004,839 B2
(45) Date of Patent: Feb. 28, 2006

(54) COMMUNICATION GAME SYSTEM, COMMUNICATION GAME METHOD, AND STORAGE MEDIUM

(75) Inventors: Yu Suzuki, Tokyo (JP); Kouki Koiwa, Tokyo (JP); Hideki Tanaka, Tokyo (JP); Takehiko Usui, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 97 days.

(21) Appl. No.: 09/949,792

(22) Filed: Sep. 12, 2001

(65) Prior Publication Data

US 2003/0050118 A1 Mar. 13, 2003

(51) Int. Cl.
*A63F 13/00* (2006.01)

(52) U.S. Cl. .......................................... 463/42; 463/31
(58) Field of Classification Search ............. 463/30–33, 463/40–42; 364/410.1, 578
See application file for complete search history.

(56) References Cited

U.S. PATENT DOCUMENTS

| | | | | |
|---|---|---|---|---|
| 4,521,014 A | * | 6/1985 | Sitrick | 463/31 |
| 5,947,825 A | * | 9/1999 | Horstmann et al. | 463/42 |
| 6,024,643 A | * | 2/2000 | Begis | 463/42 |
| 6,080,063 A | * | 6/2000 | Khosla | 463/42 |
| 6,126,548 A | * | 10/2000 | Jacobs et al. | 463/42 |
| 6,155,927 A | * | 12/2000 | Levasseur et al. | 463/42 |
| 6,227,974 B1 | * | 5/2001 | Eilat et al. | 463/40 |
| 6,419,577 B1 | * | 7/2002 | Okada et al. | 463/1 |

* cited by examiner

*Primary Examiner*—Kim Nguyen
(74) *Attorney, Agent, or Firm*—Finnegan, Henderson, Farabow, Garrett & Dunner, L.L.P.

(57) ABSTRACT

A communication game system for a competitive communicative driving game. Preliminary races are actually conducted for each client system in a single-vehicle driving style in accordance with operations by players, and qualifiers who are highly ranked according to their finishing times are selected (S1 to S10). The final races (S12) are set for the qualifiers. Also in the final races, the final races are actually conducted for each client in a single-vehicle driving style in accordance with operations by the players, and the driving data is then transmitted to the server (S11 to S14). The server processes the driving data obtained from each client and returns the processing results to each client (S14). After the network is disconnected, the processing results are reproduced and displayed as replay images at each client (S15 and S16).

12 Claims, 8 Drawing Sheets

(a)

(b)

(c)

COMMUNICATION GAME SYSTEM, COMMUNICATION GAME METHOD, AND STORAGE MEDIUM

BACKGROUND OF THE INVENTION

1. Field of the Invention

The present invention relates to a communication game system. More particularly this invention relates to a preferred communication game system for a competitive game in which objects such as vehicles in a three-dimensional virtual space are driven in response to players' operations and the players compete for the best driving time.

2. Description of the Related Art

Along with the recent development of computer graphic technology, simulation devices and game devices for both business and domestic uses have become widespread in the public realm. As one genre of these devices, there is a driving (car racing) game for competing for the fastest lap time by moving a vehicle as an object along a course set in the three-dimensional virtual space (game space), and this game is highly popular.

A simulation device or a game device for playing this type of game (hereinafter referred to as the "game device") usually comprises: a main game device which contains a computer device for executing a prestored game program; a controller for giving operation signals to the computer device for instructing the movement of the object to be expressed in the game; a display for displaying picture images along with the progress of the game as the game program is executed by the computer device; and a sound device for generating sounds along with the progress of the game.

With this game device, an object such as an automobile is displayed on the display assuming the player as a driver. The player operates the controller and provides the computer device with information such as the driving path and the driving speed. The computer device calculates in real-time the behaviors of the automobile in accordance with this operational information and obtains image data in a driving state and displays the image data on the display.

Regarding the driving game, a competitive communicative type has been in the spotlight in recent years. In the communicative game system for conducting such communicative competition, game devices (clients) operated by individual players are connected to a common game server system via communication lines, thereby forming a server-client system. The system is structured such that the game server system and each client cooperate in executing the game processing based on a specified communication protocol, thereby enabling a competitive game to be played among players in distant places.

However, when the conventional communicative game system executes a driving game, the game server system and the game devices (clients) must send and receive the driving data (position of vehicles, speed, etc.) almost in real-time and each game device must generate image data based on the driving data sent from the game server, by conducting processing which includes determination of hitting (collisions with) other vehicles and calculations of behaviors upon such hitting, and also display the image data in sequence. Accordingly, the calculation load of the game device is increased considerably. Therefore, the more detailed collision determination and detailed behavior calculations are intended, the more delays in image processing and the more omissions in picture images occur, thereby deteriorating the real-time performance. This causes the players of the game to feel stressed.

On the other hand, in this situation, there is a need for having competitions in which more importance is attached to the player's driving technique than to tactics and interference with other vehicles during a race. However, the conventional game system of competitive communicative type does not satisfy such need.

Regarding an image processing device for performing a game of this type, a simple model for collision determination, for example, a sphere, is sometimes set for each object upon determining whether objects overlap one another (such determination is sometimes called hitting or collision determination) If the determination of collisions among the forms of objects is to be conducted without using such collision models, required data and data processing load are increased, and therefore, "the data amount to be sent and received is so considerable that the communication load is adversely affected." Moreover, delays in sending and receiving data occur and the data amount to be sent and received is increased considerably, thereby delaying the image processing operation. Particularly in a high speed car racing game, even a moment of delay in the image processing operation results in causing stress to the player. Moreover, even when the simple collision model described above is used, calculations of collisions become a considerable load for the image processing device.

The present invention is devised in light of the situation that the conventional technology has faced. It is an object of the present invention to provide a game system of communicative competitive type which can cut down the processing amount of the system, secure the full real-time performance of game processing and display, and deal with the new tendency to focus on operational techniques of players.

SUMMARY OF THE INVENTION

In order to achieve each of the above objects, the game device of the present invention is structured as described below.

One category of the present invention is a communication game system for a plurality of players to play a competitive game by connecting a plurality of game client systems to a game server system via communication means, wherein the communication game system comprises: transmission means for transmitting to the game server system via the communication means the game results obtained by actually playing the game in accordance with operations by the players; processing returning means for processing the game results from each of the client systems and returning the processing results to each of the client systems via the communication means; and reproducing means for reproducing the processing results at each of the client systems.

The game results herein used correspond to operational data of players obtained by actually playing the game, game play content data, play data, or game data that includes positions, speeds, behaviors, and the like of game objects operated by players.

Another category of the present invention is a game client system of a communication game system having a game server system for a plurality of players to play a competitive game, the game client system being connected to the game server system via communication means, wherein the client system comprises transmission means for transmitting to the game server system via the communication means the game results obtained by actually playing the game in accordance with operations by the players, and reproducing means for reproducing the processing results of the game which are returned via the communication means from the game server system.

In this structure, it is desirable that the transmission means comprises first transmission means for transmitting to the game server system the game results obtained by actually participating in the preliminary races of the game in accordance with operations by the players, and second transmission means for transmitting to the game server system the game results obtained by actually participating in the final races of the game in accordance with operations by the players, and wherein the client system comprises preparation means for preparing for the finals of the game according to the ranking results of the preliminary races of the game that are returned from the game server system in response to the transmission by the first transmission means.

For example, the reproducing means reproduces the processing results of the game that are returned from the game server system in response to the transmission by the second transmission means. Both preliminary and final races of the game are the games played in accordance with a player's sole performance at each client system.

Moreover, as a preferred example, the reproducing means comprises means for changing a visual point upon reproduction. This reproducing means may display a game object which moves in accordance with operations by a player, upon whom the reproducing means focuses attention. Specifically, it is desirable that reproducing means further comprise means for enabling display and observation of a game screen from a visual point of any game object among those game objects that are reproduced and displayed based on the processing results downloaded from the server, but not among those objects that someone among the players is presently operating, and for displaying "from which visual point of an object the game screen in displayed". Moreover, this reproducing means can display by priority a game object positioned closer to a visual point when the processing results include the game objects that overlap one another in the virtual game space. Furthermore, when the processing results include the game objects that overlap one another in the virtual game space, the reproducing means may comprise means for modifying the states of the objects in order to avoid the overlapping of the objects. When the processing results include game objects that are moving with their display states overlapping that of another in a virtual game space, the reproducing means further comprises means for modifying the display states of the game objects in order to prevent these game objects from being displayed in the overlapping state at the time of reproduction of the processing results.

The reproducing means further comprises means for allowing overlapping of game objects when the processing results include the game objects that overlap in the virtual game space.

Still another category of the present invention is a game server system of a communication game system for a plurality of players to play a competitive game with their game client systems via communication means. The game server system is connected to the communication means and may comprise processing returning means for accepting via the communication means and processing the game results obtained by actually playing the game with the client systems in accordance with operations by the players, and for returning the processing results via the communication means to each of the client systems.

The game server system may comprise, for example, ranking returning means for accepting via the communication means the game results obtained by actually playing the game with the client systems in accordance with operations by the players, and deciding ranking based on the game results, and returning the ranking via the communication means to each of the client systems. Moreover it is desirable that the game server system comprises accepting means for accepting entries for the game from the plural client systems. The accepting means, for example, is the means for accepting entries for the game based on a specific algorithm which factors in the number of the entries and time-limit for entry.

In each of the structures described as above, for example, the game is a driving game for competing for the best time by driving a virtual vehicle in the virtual game space.

On the other hand, another category of the present invention is a communication game method of playing a competitive game among a plurality of players by connecting a plurality of game client systems to a game server system via communication means, which comprises the steps of: transmitting to the game server system via the communication means the game results obtained by actually playing the game in accordance with operations by the players; processing the game results obtained from each of the client systems and returning the processing results to each of the client systems via the communication means; and reproducing the processing results at each of the client systems.

Furthermore, the present invention provides a computer-readable storage medium with software program data stored therein for executing the system or the method described above.

DESCRIPTION OF THE PREFERRED EMBODIMENT

An embodiment of the present invention is hereinafter explained with reference to the attached drawings.

The embodiment of this invention relates to a communication game system for playing a driving game of a competitive communicative type by connecting a plurality of game client systems (game devices operated by players) to a game server system via communication means.

The following explanation focuses on the structures and functions necessary to perform the competitive communicative game, but it is certainly possible to have each client system (game device) function as a stand-alone game device when it does not participate in a communicative competition.

Figure 1:
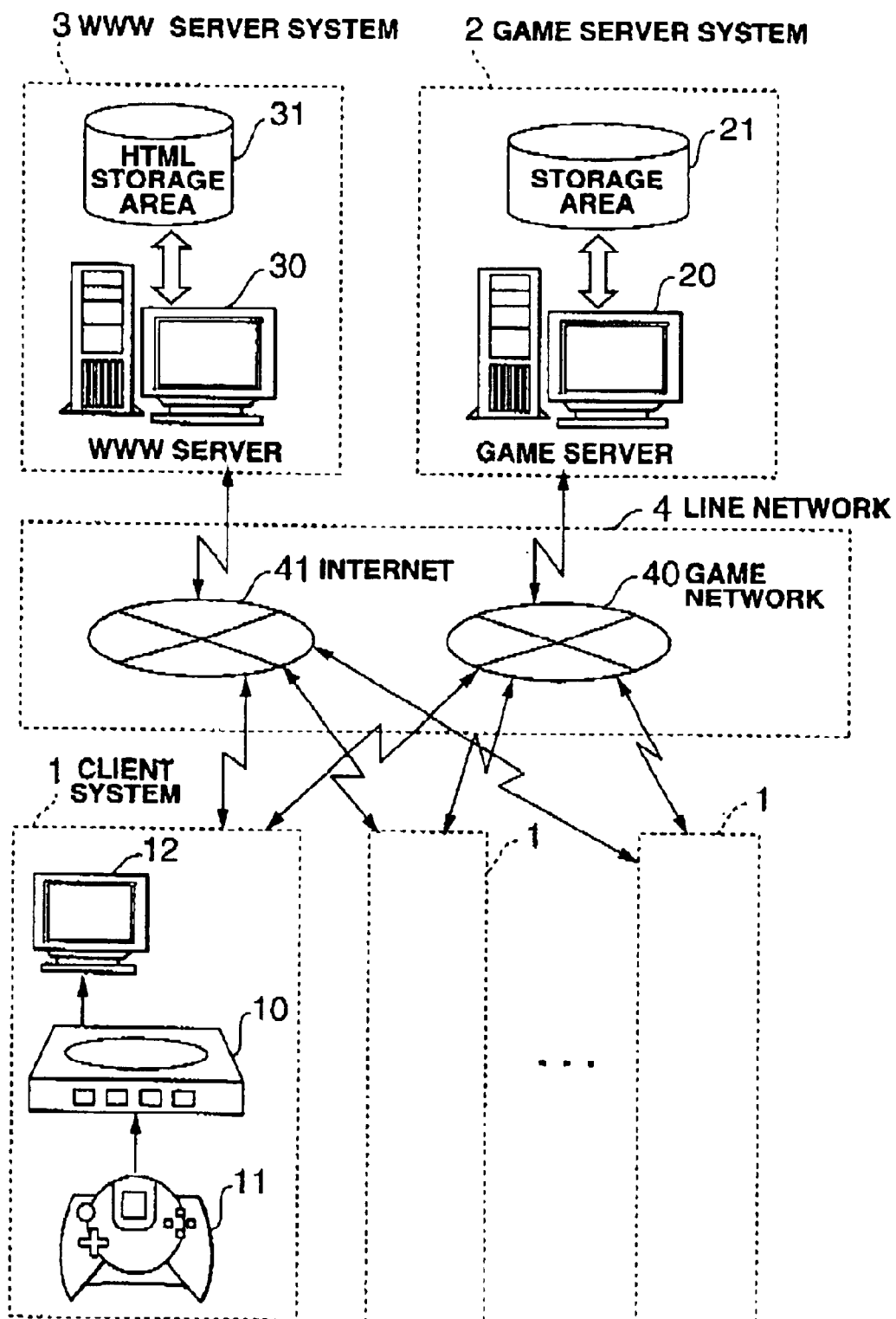
FIG. 1 is a block diagram of the communication game system according to an embodiment of the present invention.

FIG. 1 is a system diagram of the communication game system of the present invention.

As shown in FIG. 1, the communication game system is structured such that a plurality of client systems (game devices) 1 are connected to a game server system 2 and a WWW server system 3 via a line network 4.

Each client system 1 is structured as a game device having a so-called communication facility, and it is structured by connecting a main game device 10, a control pad 11 and a monitor 12 one another.

The control pad 11 is designed to provide the main game device 10 with an operation signal output in accordance with the operations by each player. The main game device 10 is structured as a computer device capable of conducting communication (including CPU, memory, CD-ROM drive, modem, image generation circuit, and sound generation circuit) This main game device 10 can read data from a storage medium such as a CD-ROM, and it functions as a client system for the communication game system by executing the game program read from the storage medium.

The main game device 10 advances the game processing based on the operation signals from the control pad 11. When a player designates the communicative game, the main game device 10 connects itself to the game server system 2 through the line network 4 via a modem located inside the main game device 10.

The game program stored on the storage medium has no limitation to its game content as long as it is capable of performing a communication game function. However, it is desirable that the game program be programmed as a game of competitive type in which competitions are held among players to decide who wins or loses and in what ranking. Moreover, the main game device 10 is adapted to output image signals and sound signals for the game processing. The monitor 12 is structured such that it supplies picture images and sounds to a player in accordance with the image signals and sound signals from the main game device 10.

The game server system 2 comprises a game server 20 and a storage area 21.

The game server 20 is structured as a general purpose high performance computer device such as a CPU, memory, HD, and communication device. This game server 20 is adapted to operate as a game server system for managing the communicative game system by executing the program which corresponds to the game method of the present invention. In other words, the game server 20 manages the client systems 1 connected to access points of a game network 40. The storage area 21 is the game server 20 itself or the area to which the game server 20 can have access, and a database necessary for performing the communication game system can be stored in the storage area 21 in the form of a file or the like.

The line network 4 is a normal public or private line and it forms a WAN such as the game network 40 and the Internet 41.

The game network 40 is a network provided to enable the operation of the communication game system. For example, it is a private network comprising the game server system 2 and a number of client systems 1, and such network is structured by connecting the client systems 1 to specific access points managed by the game server system 2. This is called a PPP connection. However, instead or such PPP connection as described above, the game network 40 may have a connection structure via the Internet in which the client systems access the game server from arbitrary connection ports. There is no limitation to the protocol but general purpose standards such as TCP/IP may be employed in consideration of cases in which the WWW function of the Internet is utilized by the client systems 1 or in which general versatility is granted to the client systems 1.

The Internet 41 is the WAN to which an unspecified number of multiple computer devices can be connected, and it is possible through the Internet 41 to browse files and transfer electronic mail and files by using various commands set by the TCP/IP protocol. Particularly, in the present embodiment, the WWW function of the Internet is used.

A WWW server system 3 comprises a WWW server 30 and a HTML (hypertext format) storage area 31.

The WWW server 30 is structured as a general purpose high performance computer device, and it is given a network address on the Internet 41. The WWW server 30 is structured such that it is possible to browse HTML format files stored in the HTML storage area 31 by designating a specified network address from the computer connected to the Internet 41. The HTML storage area 31 is a storage area managed by the WWW server 30 and it stores, in a specified directory, hypertext format files for displaying the results of the communication game, which are created by the WWW server 30 or transferred from the game server system 2. This WWW server reports competition histories. Instead of using the Internet server, a dedicated server may be set so that it is used to upload a file with the competition histories stored therein. A client system may be connected to the dedicated server to enable browsing the file.

Figure 2:
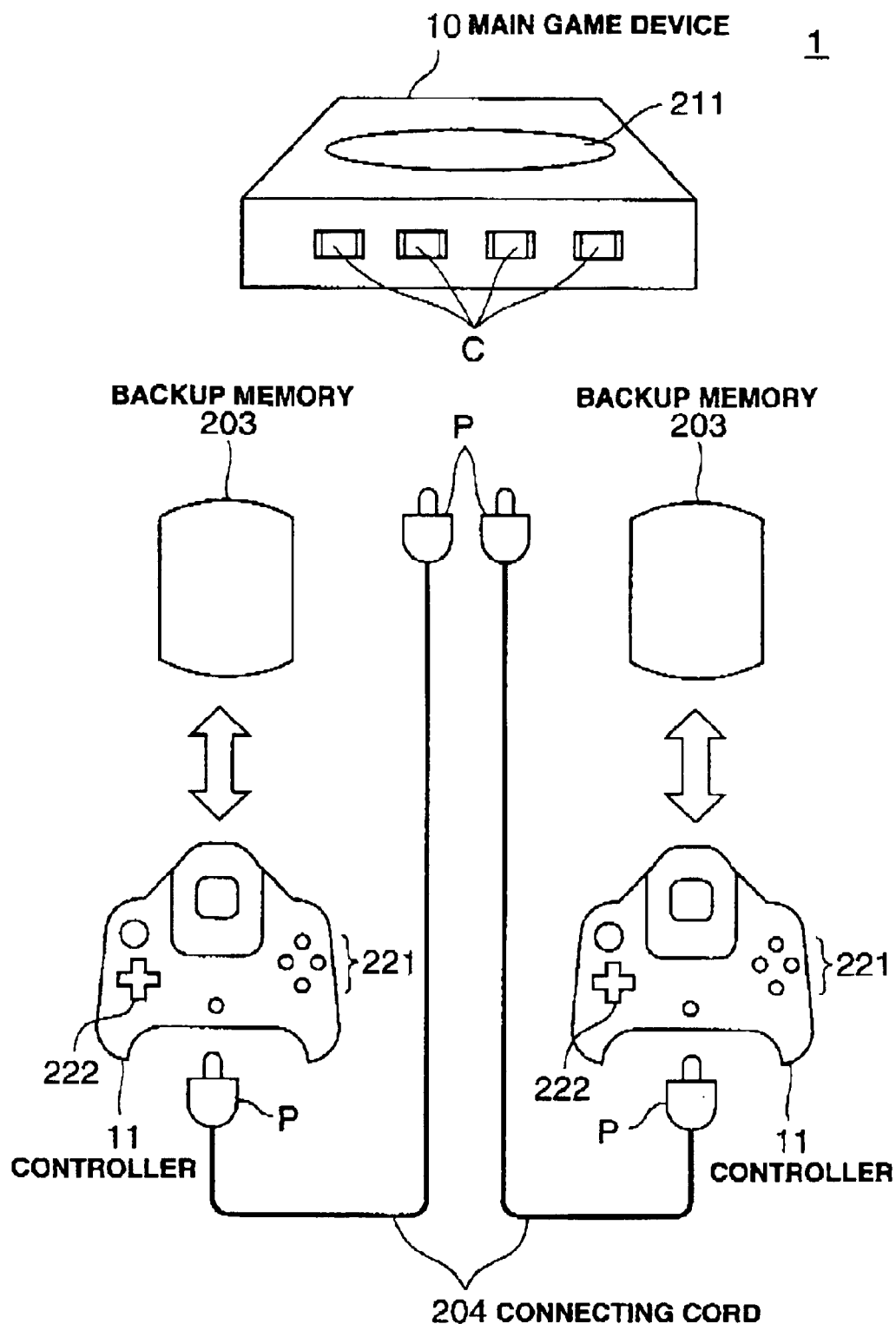
FIG. 2 is a schematic external view of the game client system incorporated into this communication game system.
Figure 3:
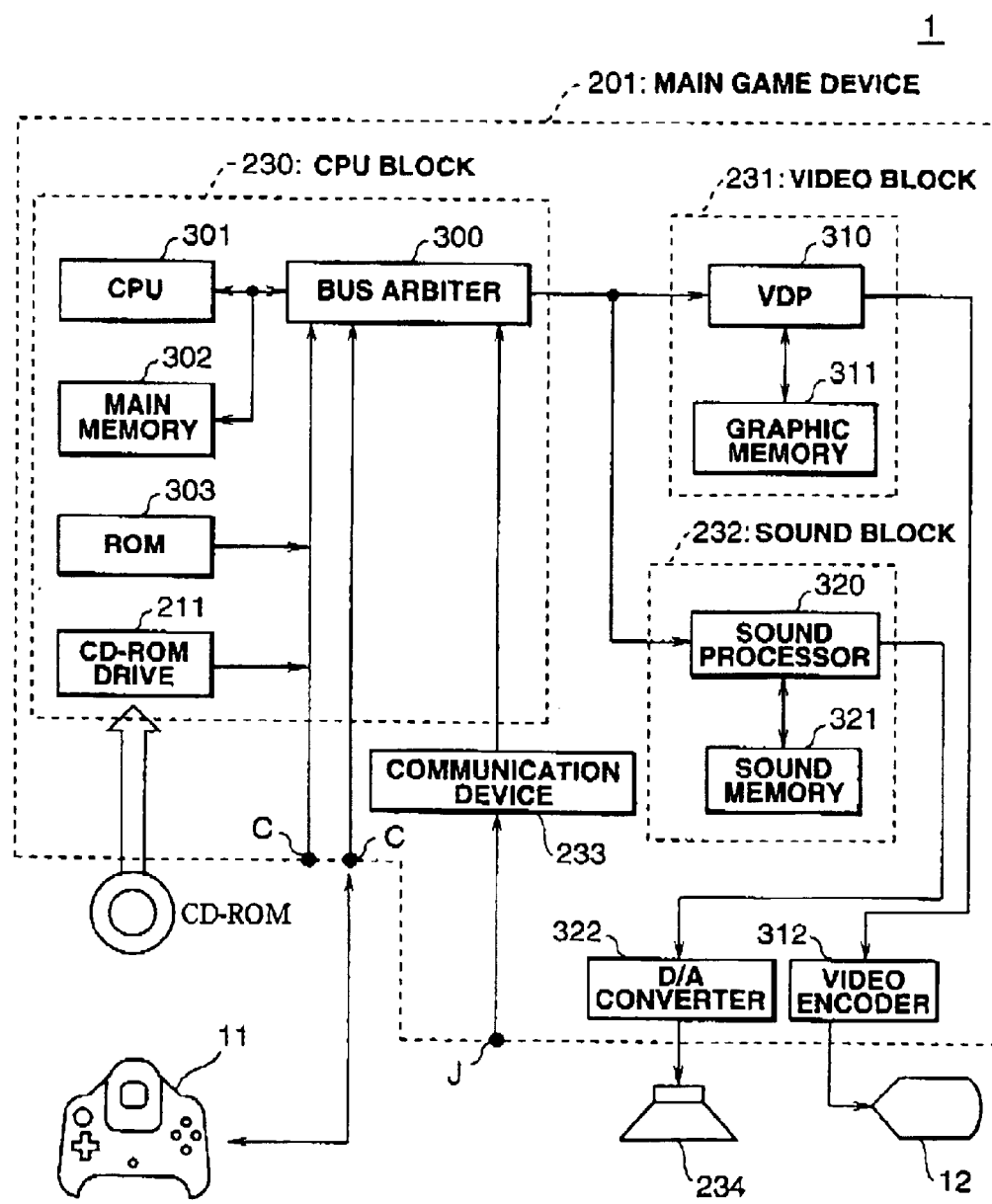
FIG. 3 is a block diagram illustrating a schematic electronic structure of the client system.

FIG. 2 is a schematic diagram of a game device as the client system 1 of the present invention. FIG. 3 is a block diagram of electronic hardware of the client system 1.

As shown in FIG. 2, this client system 1 is structured by connecting the main game device 10, controllers 11 and backup memories 203 to one another.

The main game device 10 is a main control unit in charge of the progression of the game. The main game device 10 can be connected to a plurality of controllers 11 via connectors C. Moreover, the main game device 10 comprises a CD-ROM drive 211 (see FIG. 3) and a storage medium such as a CD-ROM may be used with the main game device 10 in a freely attachable and detachable manner.

The controller 11 is structured as an operating member which each player operates, and it comprises an operational button group 221, a cross key 222 and the like. The controller 11 can be connected to the main game device 10 through a connecting cord 204 having a connector P. The backup memory 203 can be connected to the controller 11 in a freely attachable and detachable manner.

The main game device 10 has a structure similar to that of a computer device and comprises a CPU block 230, a video block 231, a sound block 232 and a communication device 233 as shown in FIG. 3.

The CPU block 230 comprises a bus arbiter 300, CPU 301, a main memory 302, ROM 303, and a CD-ROM drive 211. The bus arbiter 300 is structured such that it can control sending and receiving of data (by allotting bus occupying time to the devices connected to one another via the bus). The CPU 301 is structured such that it can have access to the backup memory 203 via the main memory 302, the ROM 303, the CD-ROM drive 211, the video block 231, the sound block 232, and the controller 11.

The CPU 301 performs various kinds of game processing and controlling that are necessary to play the competitive communication driving game. It can transfer image data to a graphic memory 311 and sound data to the sound memory 321.

The processing performed by this CPU 301 includes processing to accept various kinds of operational information as commanded from the controller 11, processing to reflect the accepted information in the game, processing of behavior calculation (simulation) of vehicles, and processing to calculate special effects.

The behavior calculation is to simulate the movement of a vehicle in the three-dimensional virtual space (game space) This calculation is performed by deciding coordinate values of polygons of a vehicle in the three-dimensional virtual space, and then, designating to a VDP 310 a conversion matrix and geometric data (polygon data) for converting the coordinate values into a two-dimensional visual field coordinate system. The polygon data means a coordinate data group of relative or absolute coordinates of each vertex of polygons (polygon: mainly triangle and quadrangle) which are composed of a set of a plurality of vertexes.

The ROM 303 is a storage area of an initial program loader. The ROM 303 is an element constituting a part of the storage medium of the present invention, and stores in advance a program necessary for the processing of the CPU 301. Alternatively, another CD-ROM may be used as the storage medium.

The CD-ROM drive 211 uses a CD-ROM as an element constituting a part of the storage medium of the present invention and as a storage medium for data supplied externally. However, without limitation to such structure, the drive 211 may be structured such that it can read other various kinds of storage media. Moreover, it may be structured such that it transfers a program to a memory via the communication device 233. If the CD-ROM drive 211 is set as described above, it is possible to transfer data from a fixed disk of a remote server.

The video block 231 comprises a VDP (video Display Processor) 310, a graphic memory 311, and a video encoder 312. With this structure, the video block 231 can generate three-dimensional image data and movie images. Specifically, texture is pasted onto the geometric data of the converted visual field coordinate system, and polygon screens (simulation results) of vehicles and landforms (background) and scroll screens of character information are synthesized in accordance with a designated priority, thereby generating final frame image data at fixed intervals.

The video encoder 312 is structured such that it can convert the image data generated by the VDP 310 to specified television signals of a certain format such as NTSC and output the television signals to a main monitor 12 (a cathode ray tube of a television receiver) connected externally.

The sound block 232 comprises a sound processor 320, a sound memory 321, and a D/A converter 322. With this structure, the sound block 232 can synthesize sounds based on waveform data and output audible signals. The D/A converter 322 is structured such that it can convert the sound data generated by the sound processor 320 into analog signals and output them to a speaker 234 (a speaker of a television receiver or an acoustic device) connected externally.

The communication device 233 is, for example, a modem or a terminal adapter, and it can be connected to the client systems 1 and functions as an adapter for connecting the main game device 10 and an external line. The communication device 233 can receive the data transmitted from a game supply server such as the Internet server connected to a public network, and supply the data to the bus of the CPU block 230. As for the public network, there is no limitation to the type of networks, whether a subscriber's line or a private line, or whether cable or wireless.

Subsequently explained is the processing of a driving game of the competitive communicative type performed by the communicative game system of the present embodiment, with reference to FIGS. 4 to 7.

Figure 4:
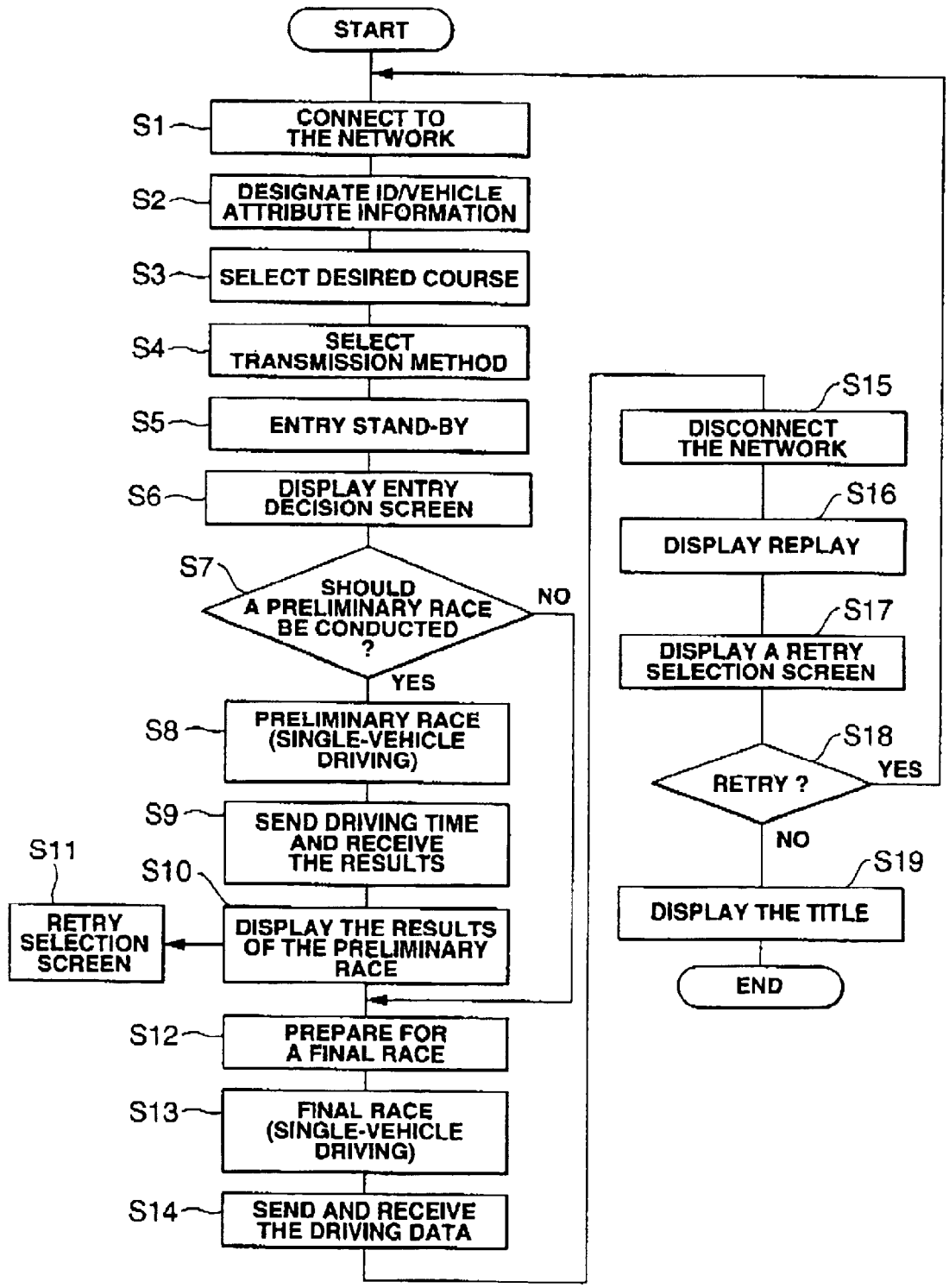
FIG. 4 is a schematic flow chart illustrating one sample sequence of a competitive game.

FIG. 4 shows the outline of the processing in the communication game system, which the client systems 1 (game devices) and the game server system 2 perform under a specified communication protocol.

According to this processing, each player connects his/her client system 1 to the line network 4 using, for example, a telephone dial-up, thereby connecting the client system 1 to the game server system 2 via the game network 40 (Step S1 in FIG. 4).

Each player then designates, by referring to a display screen on the monitor 12 of the client system 1, the ID of the player who enters into the game as well as vehicle attribute information such as a vehicle type and its color (Step S2), selects a driving course which the player desires (Step S3), and further selects a transmission method which imitates a vehicle whether AT or MT (Step S4). Subsequently, the client system 1 proceeds to an entry stand-by period (Step S5). By this entry stand-by processing, for example, sixteen entry vehicles (entry players) at maximum can be gathered.

Figure 5:
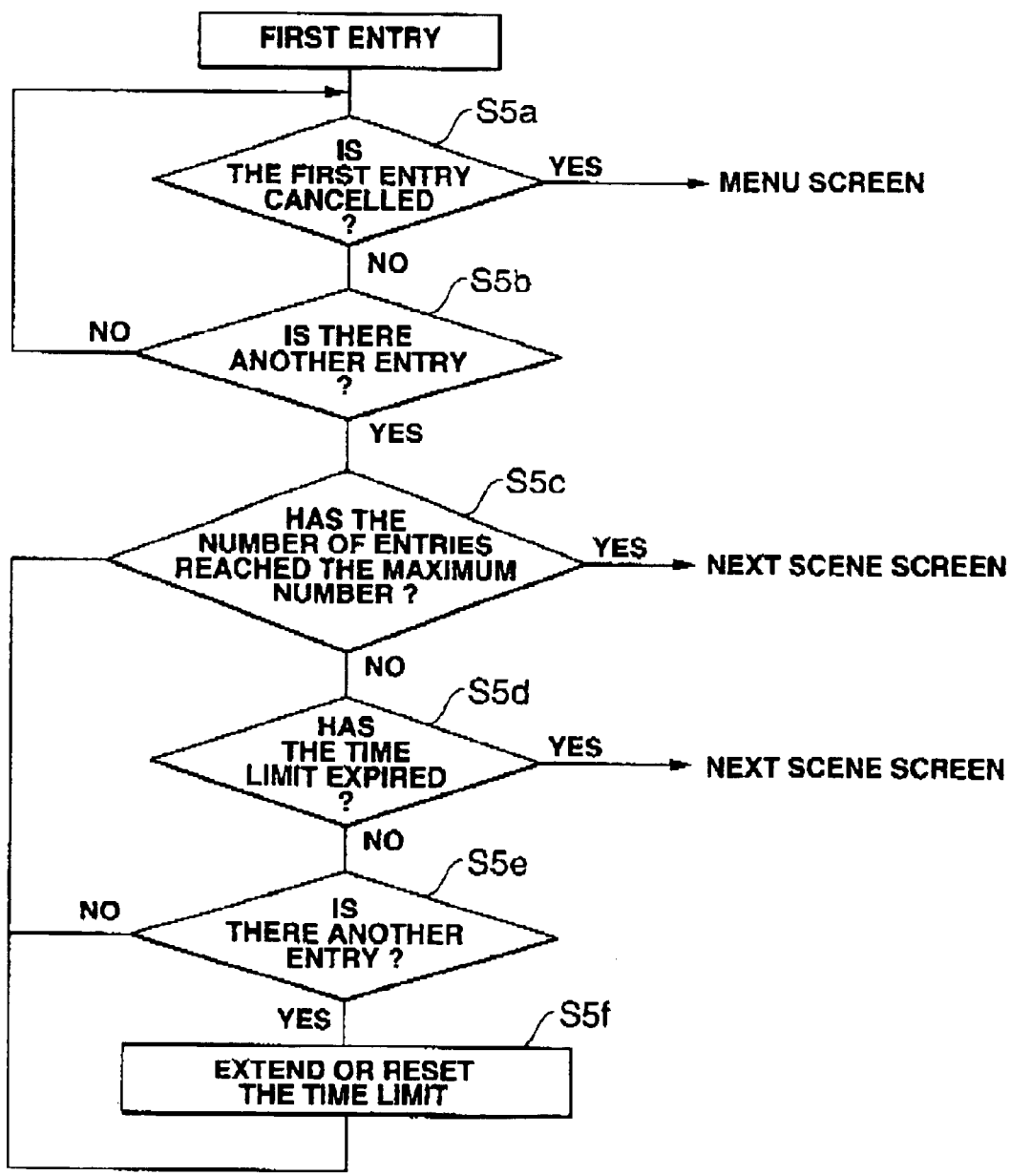
FIG. 5 is a partial flow chart illustrating one example of entry-standby processing.

FIG. 5 shows one example of the detailed processing at the time of entry stand-by, which is performed by the game server system 2.

The game server system 2 determines whether a cancel button is pressed or not after a first player enters into the game (Step S5a). If the cancel button is pressed, the game server system 2 causes the display screen of the client system 1 of the relevant player to return to the menu screen. On the other hand, if the cancel button is not pressed, the game server system 2 determines whether another player has entered into the game or not (Step S5b). If there is no next entry for the game, the game server system 2 returns to Step S5a. If there is a next entry, the game server system 2 determines whether the number of entries has reached a specified maximum number (for example, 16 players) or not (Step S5c).

If it is determined that the number of entries has reached the maximum number, the next scene is displayed on the screen. However, if the number of entries has not reached the maximum number, the game server system 2 determines whether a time limit for the entries (for example, 20 seconds) has expired or not (Step S5d). If the time limit has expired, the next scene is displayed on the screen. On the other hand, if the time limit has not expired, it is determined whether there is another player who enters into the game or not (Step S5e). It there is no such entry, the system returns to the determination of the maximum number of entries and the above processing is repeated. If there is an additional entry, the processing to extend the time limit for entry or setting the time limit back to the original time limit for entry is conducted (Step S5f), and the system then returns to the determination of the maximum number of entries and the above processing is repeated.

There is a case in which only one player enters into the game. In this case, the client system 1 is informed that a competitive game does not take place. Alternatively, if there are not enough entries to perform a preliminary race, there may be a case in which the preliminary race is omitted and a final race is directly performed, as explained later.

When the above-mentioned entry stand-by period is over, the game server system 2 transmits to each client system 1 the selected contents of the entries and causes the contents to be displayed (Step S6). Accordingly, each player becomes aware, from his/her entry decision screen, of the number of entries of players, ID numbers of the players who have entered into the game, vehicle attribution information such as types and colors of vehicles, and the selected driving course.

Regarding the driving course, the game server system 2 decides on such a driving course as desired by each player based on an appropriate algorithm. For example, it is possible to decide on a driving course desired by a majority of the entries as the selected course. Alternatively, it is also possible to adopt a driving course desired by a player who makes an entry first, or a driving course desired by a player who won the previous game.

Subsequently, the game server system 2 determines whether a preliminary race should be conducted or not, and then informs each client system 1 of the determination. Specifically, if the number of entries does not reach the specified minimum number (for example, 8 players), the game server system 2 cancels the preliminary race and directly orders a final race, which is explained later. If the number reaches the minimum number, each client system 1 is informed that the preliminary race will be conducted.

When the preliminary race is conducted, each client system 1 makes the player play in the preliminary race within a specified period of time in a state of single-vehicle driving (Step S8). The preliminary race by means of this single-vehicle driving may be a single game style in which only one game is performed, or the preliminary race may be conducted by performing a specified number of more than one race and selecting a best time among the races.

This preliminary race is different from the conventional driving game of the competitive communicative type in that a player solely drives his/her vehicle object along a decided driving course in the virtual game space and executes his/her driving technique. Accordingly, only his/her vehicle driving along the driving course is displayed in real-time on the screen of the monitor 12 based on the game processing of the CPU 301. Because no other vehicles exist on the course, there is no need for collision determination involving other vehicles. The CPU 301 is set to not perform the collision determination, thereby considerably reducing the processing load. However, the determination of collisions against structures such as road surfaces, walls, road shoulders is performed. Such collision determination can be conducted easily because the locations of the structures are previously fixed.

When the preliminary race is over, the running time result (for example, the time required to drive around the designated driving course once) is transmitted to the game server system 2 and at the same time the system 2 accumulates the running time of the respective client systems 1 and returns the accumulated results to each client system 1 as preliminary race results (Step S9). Therefore, the client system 1 displays the returned preliminary race results (Step S10). A list of the running time in the preliminary race (single-vehicle driving) is displayed on the display screen of the preliminary race results, and qualifiers (for example, top 8 players among 16 players) are marked in the list. The contents to the subsequent displays on each client system 1 will change automatically depending on whether the relevant player is marked or not, i.e., whether the player has passed the preliminary race or not.

In other words, the client systems 1 of the players who does not pass the preliminary race display the preliminary race results screen for a specified period of time, and then, display a retry screen (Step S11). Accordingly, either new or the same players as the last time make entries into a desired preliminary race of the driving game.

On the other hand, the client systems 1 of the players who passed the preliminary race display the preliminary race results screen for a specified period of time and then display a preparation screen for a final race (Step S12). With this preparation screen, it is possible to select a driving course. The game server system 2 processes the selected information of each player on the basis of a specified algorithm, decides on a driving course, rules of the final, and other necessary conditions, and informs each client system 1 of such conditions.

After the players pass the preliminary race, they can withdraw from the final race by pressing, for example, an "EXIT" button on the screen of the preliminary race results.

When the preparation for the final race is completed, each client system 1 performs the final race among the qualifiers in a single-vehicle driving style (Step S13). Specifically, the player drives along the specified driving course by himself/herself by operating the controller 11 just as he/she did in the preliminary race. Image data (and sound data) is generated almost in real-time in accordance with the way driving is performed, in the same manner as the preliminary race, and the generated image data is displayed on the main monitor 12 of the player.

At the same time, in the final race, the CPU 301 of each client system 1 saves driving data (composed of the driving position of a vehicle object, driving speed, and a part of the switch data of the controller 11) at intervals of a specified number of frames. Concerning the number of frames, it is desirable that the driving data be saved about every five frames in consideration of the deterioration of image quality of the replay images to be shown later as well as prevention of an increase in the processing amount. The final race is different from the preliminary race in this saving of the driving data.

When the final race, in the form of single-vehicle driving, is completed, the driving data of the final race is sent and received between each client system 1 of the players who joined the final race and the game server system 2 (Step S14). Specifically, each client system 1 uploads its driving data to the game server system 2, and the game server system 2 accumulates the driving data (including types and colors of other vehicles) of all the client systems 1 that joined the final race and delivers the accumulated driving data to all the client systems 1.

Subsequently, the client systems 1 disconnect from the network that includes the game network 40 and proceed to off-line operation (Step S15) As described above, the client system 1 in the on-line state makes entries into the game, performs preliminary races, displays the results of the preliminary races, performs final races, and sends and receives the driving data, and then proceeds to the off-line state.

Figure 6:
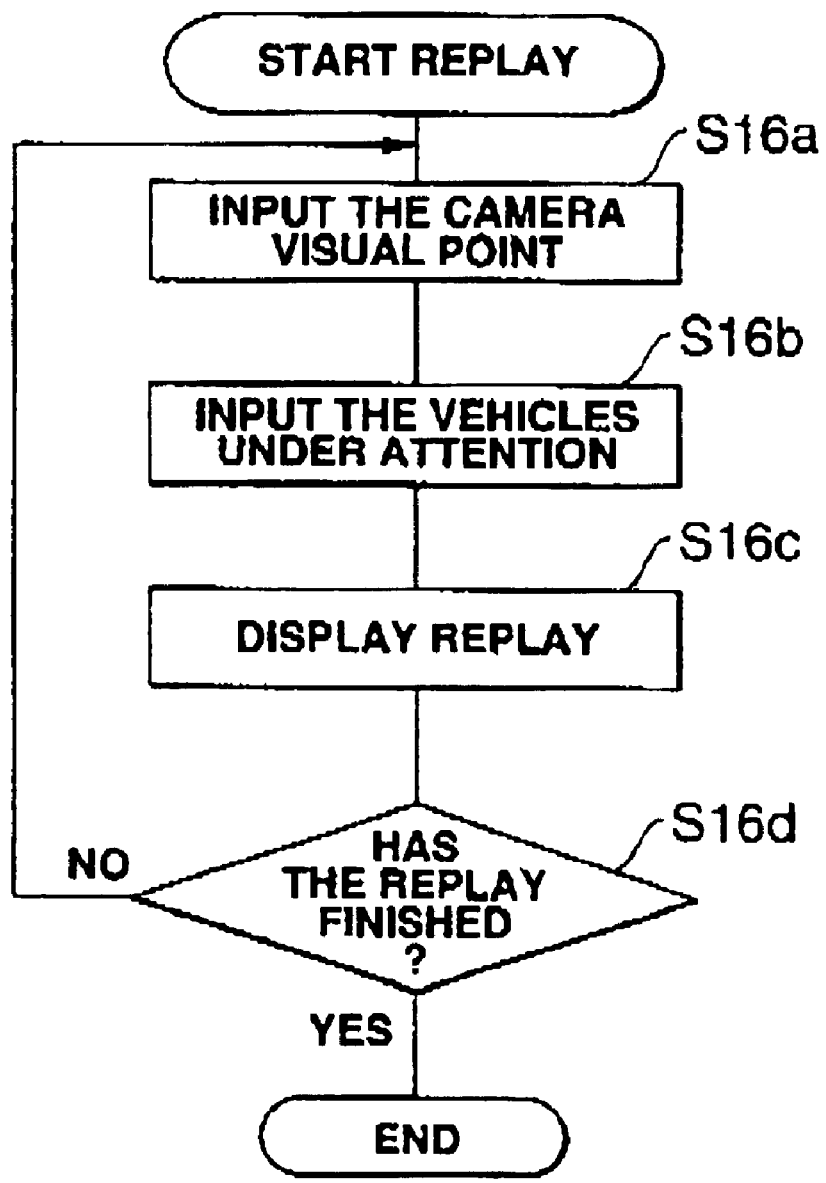
FIG. 6 is a flow chart explaining the outline of replay display.

Each client system 1 that joins the final race and proceeds to the off-line state, displays replay images of all the vehicles in the final race that have been already delivered from the game server system 2 (Step S16, i.e., Steps S16*a* to S16*d* of FIG. 6). Upon this replay display, the CPU 301 receives, from a player, information about a visual point of a virtual camera that the player prefers and the vehicle on which the player focuses attention (Steps S16*a* and S16*b* in FIG. 6) Therefore, the CPU 301 reproduces the replay images projected from the designated camera visual point on the basis of the delivered driving data of the final race, and displays the replay images on the main monitor 15.

Letters and marks indicating "the vehicles under attention" are displayed on a part of the replay image. For example, they can be ID numbers of the vehicles (or players) on which a player focuses attention or wishes to focus attention, or they can be marks (such as arrows) following the vehicles under attention to point at such vehicles.

Moreover, the camera visual point may be a visual point inside a vehicle of a player himself/herself, or it may be a visual point for viewing the player's vehicle from another vehicle, or it may be a visual point in the sky for looking down on all the vehicles participating in the final race. If the camera visual point is changed in the middle of the replay, a display visual point for the replay images is changed correspondingly in real-time.

Furthermore, the CPU 301 is characterized in that it does not conduct the determination of collisions between vehicles upon displaying the replay. "Accordingly, when more than one vehicle occupies the same position, or when the vehicles come to a driving position that spatially overlap one another in the virtual space, in a picture image of such frame, one of the vehicles having a part which is positioned closer to the camera visual point than the other vehicles, is displayed. Thus, when a plurality of vehicles are in the same position momentarily, the body of a vehicle having a part which is positioned behind other vehicles, is not displayed." This is permitted based on the facts that the replay is the reproduction of the final race which has actually finished and the player sees the replay knowing this fact (in order to review the race and as reference for a next race), that such overlaps of plural vehicles are mostly momentary, and that a vehicle having a part which is positioned behind the other vehicles would look as if it were a ghost vehicle, and therefore, "it may in fact cause the player to be interested in the game".

Meanwhile, the processing load is decreased by not performing the collision determination, thereby preventing delays in displaying images and omissions of images and bringing about a significant advantage of eliminating stress to the players. Moreover, not all frames are displayed, but the frames are displayed with some of them taken out evenly to the extent necessary to avoid any difficulties in viewing the screen. Accordingly, it is possible to provide stable replay images by inhibiting the increase in the amount of calculation by the client systems 1 and by preventing delays in displaying picture images. As one example of the fact that "the frames are displayed with some of them taken out evenly to the extent necessary to avoid any difficulties in viewing the screen", complementary processing is performed with regard to movements occurring between the frames, where some data has been extracted, to be displayed on the basis of the data collected after taking out evenly some frames to such an extent that the processing and communication load does not become excessive and that the movements subject to the complementary processing are not considerably different from the behaviors of the objects at the time of the actual operation even if the complementary processing is left to calculation by the client devices. For example, the processing means collects data every five frames, but it complements such data and displays the frames as one at the time of the replay.

Moreover, since the final race actually conducted is a single-vehicle driving, each player can concentrate on making full use of his/her driving technique without worrying about interference from other vehicles while driving. Consequently, it is possible to prevent those players who are inferior in techniques from losing their interest in the game while driving in the final race.

When the replay display is thus completed, a retry screen is displayed and the processing returns to Step S1 described above if the player wishes to make another entry into the game (Steps S17 and S18). When the "EXIT" button is pressed on the retry screen, the screen returns to the initial title screen (Step S19).

Figure 7:
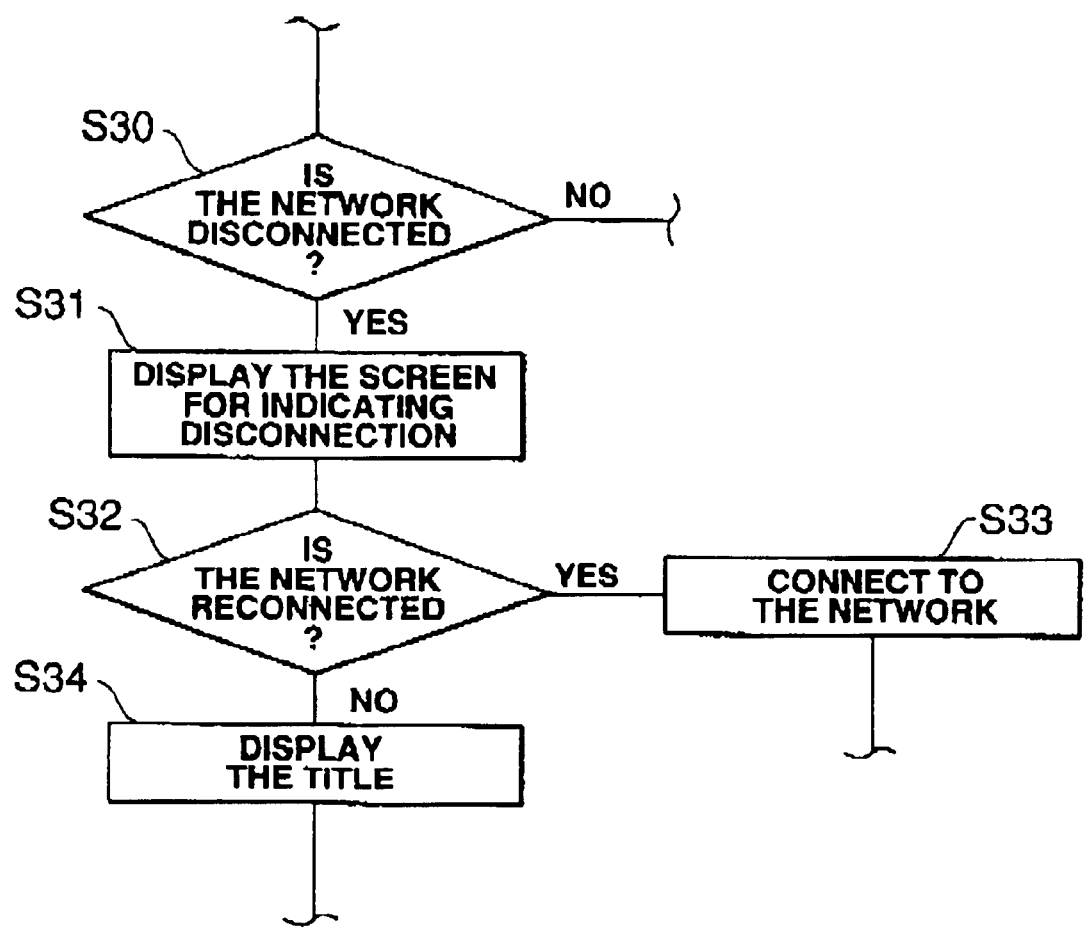
FIG. 7 is a partial flow chart explaining one example of the processing which occurs upon disconnecting the network.

There will be no problem when the processing proceeds from entries of the specified number or more of the players into to the game, preliminary races, final races, and then to replays as described above. However, there are some cases in which the network is forcibly disconnected to quit the game in the middle, for example, during the stand-by after the entry or in the middle of driving a vehicle. For example, as shown in FIG. 7, when the network is disconnected (Step S30), a screen informing such disconnection is displayed on the monitor 12 of the client system 1 which was disconnected (Step S31). The client system 1 is allowed to join the game again only if it connects itself to the network (Steps S32 and S33). However, according to the algorithm for proceeding the game, there are times when the player is forced to a retry, such as when the time is over and the player is given a notice indicating disadvantageous conditions. If the network is not reconnected, a specified title is displayed (Step S34), informing that the player of the client system 1 has dropped out of the game. If the power of the client system 1 is lost in the middle of the game, the game server system 2 treats it as dropping out of the game.

As explained above, the communicative game system of this embodiment in the network connection (on-line) state performs the processing to make the entry into the game, to perform preliminary races (by single-vehicle driving), to display the results of the preliminary races, to perform final races (by single-vehicle driving), to send and receive the driving data in the final races and the communication game system then disconnects (off-line). The player enjoys the game by replaying the final race as seen from his/her favorite camera visual point. At the time of replaying, the determination of collisions between vehicles is not conducted, thereby eliminating stress due to any delay in displaying images due to the collision determination. Accordingly, it is possible to provide the game system of the communicative competitive type which can cut down on the processing amount of the system, secure the full real-time performance of the game processing and displaying, and follow the new trend of attaching importance to the operation techniques of the players.

Figure 8:
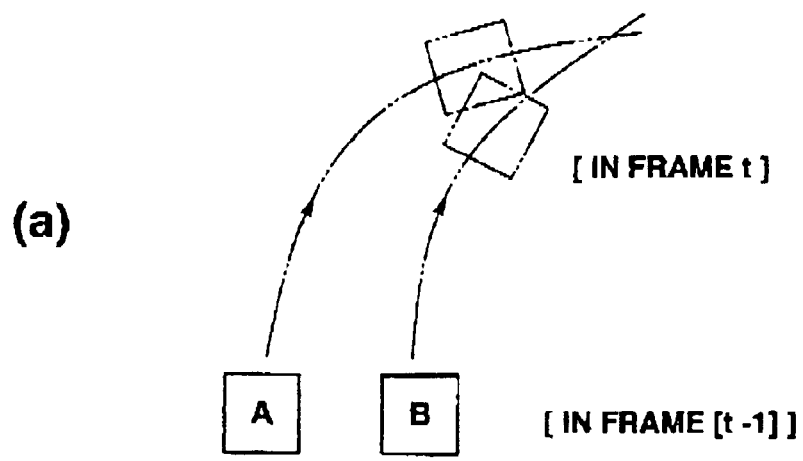
FIG. 8 shows diagrams explaining such modification processing at the time of replay that prevents vehicles from overlapping one another.
Figure 8:
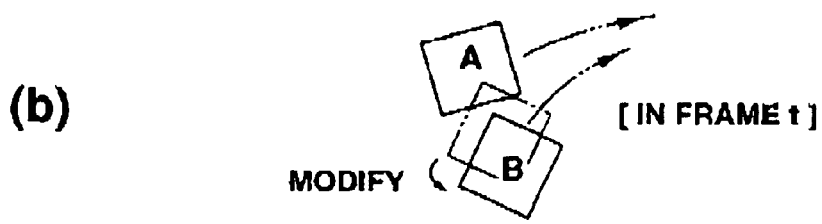
Figure 8:
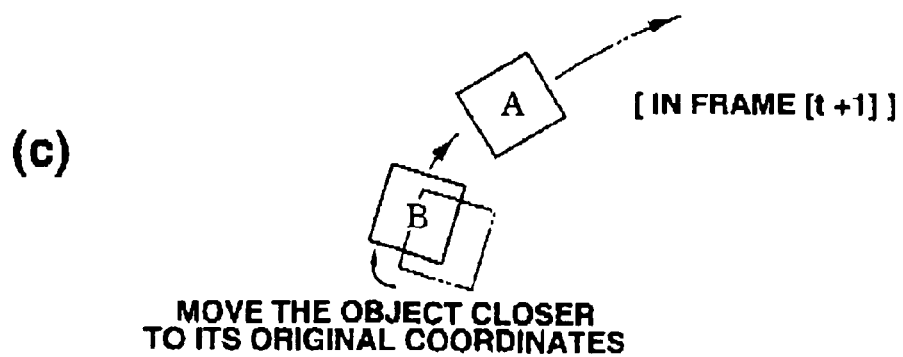

In the above embodiment, at the time of the replay after the final race, images are displayed on the basis of the delivered driving data without the collision determination. However, this embodiment may be modified in this regard as shown in FIG. 8. Specifically, it is possible to change the setting for replay so that the vehicles can run side by side or overtake one another without overlapping one another. In this embodiment, reference can be made in advance to the coordinate data of the vehicles with regard to all the vehicles and all frames in the driving data. Accordingly, such reference is made in advance. As a result of this reference, as shown in FIG. 8(a) for example, when it is judged that vehicles A and B will overlap one another in frame t, the position of vehicle B positioned behind vehicle A in the frame t is forcibly modified to such an extent that vehicle B will not overlap vehicle A positioned ahead (see FIG. 8(b)). Subsequently, in frame t+1, the processing is conducted to advance vehicle A according to the recorded driving coordinate data, and to move vehicle B, the position of which was modified, closer to the original coordinates (the recorded coordinates) (see FIG. 8(c)). Accordingly, it is possible to provide more natural replay images by modifying the positions of the vehicles to such an extent that the player would not feel that the representation was awkward.

The present invention is not limited to the above-described embodiment, but it can be variously modified or changed within the scope of the claims of the present invention. For example, the content of the game that can be performed by the communicative game system of this invention is not limited to the driving game for competing for the best time by driving along a driving course as described above, but it may be, for example, a game of water skiing, snow skiing, or a bike race. Moreover, the replay display may be allowed for the preliminary races. Furthermore, the game may be set to proceed from preliminary races, semi-final races, and then to final races.

The finals may be directly conducted without conducting any preliminary race, In that case, starting positions of the respective racing cars may be decided either in the entry order, at random, or as the same starting positions. If there is only one player who has entered the preliminary races, it is possible to make the system wait for another entry without a time limitation. Moreover, the course of preliminary races may be used, without any change, for final races. Furthermore, driving courses for the preliminary and final races may be decided at random. Instead of the vehicles, the objects may be any movable bodies which can compete against one another, such as airplanes, boats, or horses, or any characters imitating human beings or imitating at least the actions of human beings.

According to the invention described in the above embodiment, the driving operation for collecting the driving data of the preliminary and final races is conducted by the client devices (each game terminal) and there is no data sent or received between the client devices. Accordingly, it is possible to collect the driving data without being adversely affected by a large communication load.

Moreover, the system may be set in such a manner that when a player enters a race, the circuit is disconnected once before the race starts, and the circuit is then reconnected in order to upload data after the race is finished. This is to avoid the situation in which a telephone circuit is always connected while the game is performed at the client systems. In this case, the system may also be set in such manner that a user can upload arbitrary driving data (or his/her best driving time) to the server, or the user can check the number of races conducted on the side of the game terminal device and upload the driving data of a first race to the server without fail after he/she connects his/her game terminal device to the server.

In the embodiment described above, a preliminary race can be conducted even for only one player and a starting position can be set ahead or behind depending on the player's time in the preliminary race. Furthermore, the visual point of the virtual camera may be set at a specified position on the course or at an arbitrary position outside a vehicle (for example, beside the vehicle to follow the vehicle as it runs).

The content of the game which the game system of the present invention can perform is not limited to the driving game, but the game system can be applied to general games, except those which feature competing players' techniques which make their game objects collide with one another. Specifically, such applicable games include track and field games, and so-called action games, the purpose of which is to clear various obstacles to reach a specified goal. When a game is structured such that game objects of a plurality of players interfere with one another, each player is disturbed, by the interference of the game objects operated by the other players, in exercising his/her operating technique which the player judges most appropriate; thereby it becomes impossible to compete purely based on the players' operation techniques. Application of the present invention to such games makes it possible for the players to compete only based on their operating techniques.

As explained above, the communication game system of the present invention can provide the game system of the competitive communicative type which can cut down on the calculation amount of the system, secure the full real-time performance of the game processing and display, and follow the new trend of attaching importance to the players' operation techniques.

What is claimed is:

1. A communication game system for connecting a plurality of game client systems to a game server system via communication means and enabling a plurality of players to play a competitive game, comprising:
    transmission means for transmitting to said game server system via said communication means game results of said players being obtained from said players actually operating and playing the game using single game object operating means when the client systems and the server system maintain communication;
    processing returning means for processing the game results from each of said client systems and returning the processing results to each of said client systems via said communication means;
    reproducing means for reproducing the processing results at each of said client systems, wherein only each player's game object is displayed at each player's client system and each player's game object does not interfere with other players' game objects during a replay of game play; and
    interference processing means for determining collisions between game objects during single player game play, wherein the interference processing means does not determine collisions between the game objects during the replay of game play.

2. The system according to claim 1, wherein said game is a driving game for competing for the best time of driving a virtual vehicle in a virtual game space.

3. A game client system of a communication game system having a game server system for a plurality of players to play a competitive game, the game client system being connected to said game server system via communication means, comprises:
    transmission means for transmitting to said game server system via said communication means game results of said players being obtained from said players actually operating and playing the game using single game object operating means when the client systems and the server system maintain communication;
    reproducing means for reproducing processing results of said game which are returned via said communication means from said game server system, wherein only each player's game object is displayed at each player's client system and each player's game object does not interfere with other players' game objects during a replay of game play; and
    interference processing means for determining collisions between game objects during single player game play, wherein the interference processing means does not determine collisions between the game objects during the replay of game play.

4. The client system according to claim 3, said transmission means further comprising:
    first transmission means for transmitting to said game server system the game results of said players being obtained from said players actually controlling and participating in one or more preliminary races of said game;
    second transmission means for transmitting to said game server system the game results of said players being obtained from said players actually controlling and participating in one or more final races of the game; and
    preparation means for preparing for the finals of said game according to a set of ranking results of the preliminary races of said game that are returned from said game server system in response to the transmission by said first transmission means, wherein both the preliminary races and the final races of said game are the games played by each player's performance at each client system, and
    wherein the processing results simultaneously reflect the game results of all players in the preliminary races or the final races.

5. The client system according to claim 4, wherein said reproducing means reproduces the processing results of said game that are returned from said game server system in response to the transmission by said second transmission means,
    wherein both the preliminary races and the final races of said game are the games played by each player's performance at each client system, and
    wherein the processing results simultaneously reflect the game results of all players in the preliminary races or the final races.

6. The system according to claim 1 or 4, wherein said reproducing means comprises means for changing a visual point upon reproduction.

7. The system according to claim 1 or 4, wherein said reproducing means comprises means for displaying a game object which moves in accordance with operations by a player upon whom said reproducing means focuses attention.

8. A game server system of a communication game system for a plurality of players to play a competitive game using their game client systems via communication means, the game server system being connected to said communication means, comprising:

processing returning means for accepting and processing a set of game results, via said communication means and processing the game results of said players being obtained from said players actually operating and playing the game using single game object operating means using said client systems when the client systems and the server system maintain communication, and for returning the processed game results via said communication means to each of said client systems, wherein only each player's game object is displayed at each player's client system and each player's game object does not interfere with other players' game objects during a replay of game play; and interference processing means for determining collisions between game objects during single player game play, wherein the interference processing means does not determine collisions between the game objects during the replay of game play.

9. The game server system according to claim 8 further comprising ranking returning means for accepting via said communication means the game results of said players being obtained from said players actually operating and playing the game using said client systems, and for deciding ranking based on the game results, and returning the ranking via said communication means to each of said client systems.

10. The game server system according to claim 8 or 9, comprising accepting means for accepting a number of entries for said game from said plurality of client systems.

11. A graphic controlling method for a communication game system for connecting a plurality of game client systems to a game server system via communication means and enabling a plurality of players to play a competitive game, comprising the steps of:

transmitting to said game server system via said communication means a number of game results of said players being obtained from said players actually operating and playing the game when the client systems and the server system maintain communication;

processing the game results obtained from each of said client systems and returning processing results to each of said client systems via said communication means, wherein the processing results simultaneously reflect the game results of all players in preliminary races or final races;

reproducing the processed game results in each of said client systems, wherein only each player's game object is displayed at each player's client system and each player's game object does not interfere with other players' game objects during a replay of game play; and determining collisions between game objects during single player game play, wherein collisions are not determined between the game objects during the replay of game play.

12. A computer-readable storage medium with software program data stored therein for executing a graphic controlling method for a communication game system for connecting a plurality of game client systems to a game server system via communication means and enabling a plurality of players to play a competitive game, the method comprising:

transmitting to said game server system via said communication means a number of game results of said players being obtained from said players actually operating and playing the game when the client systems and the server system maintain communication;

processing the game results obtained from each of said client systems and returning processing results to each of said client systems via said communication means, wherein the processing results simultaneously reflect the name results of all players in preliminary races or final races;

reproducing the processed game results in each of said client systems, wherein only each player's game object is displayed at each player's client system and each player's game object does not interfere with other players' game objects during a replay of game play; and determining collisions between game objects during single player game play, wherein collisions are not determined between the game objects during the replay of game play.

* * * * *